US008464853B2

(12) United States Patent
Youngwerth et al.

(10) Patent No.: US 8,464,853 B2
(45) Date of Patent: Jun. 18, 2013

(54) APPARATUS AND SYSTEM FOR AUTOMATIC CENTRIFUGAL ENGAGEMENT OF A PRESSURE PLATE

(75) Inventors: Albert J Youngwerth, Boise, ID (US); Daniel S Youngwerth, Boise, ID (US); Sean G Brown, Boise, ID (US)

(73) Assignee: Rekluse Motorsports, Inc, Boise, ID (US)

( * ) Notice: Subject to any disclaimer, the term of this patent is extended or adjusted under 35 U.S.C. 154(b) by 985 days.

(21) Appl. No.: 12/141,780

(22) Filed: Jun. 18, 2008

(65) Prior Publication Data
US 2008/0308380 A1 Dec. 18, 2008

Related U.S. Application Data

(60) Provisional application No. 60/944,721, filed on Jun. 18, 2007.

(51) Int. Cl.
*F16D 43/12* (2006.01)

(52) U.S. Cl.
USPC .......................................... 192/105 B; 192/83

(58) Field of Classification Search
USPC .................... 192/70.23, 70.27, 89.22, 105 B
See application file for complete search history.

(56) References Cited

U.S. PATENT DOCUMENTS

| 3,265,172 | A | * | 8/1966 | Atsumi et al. | 192/105 B |
|---|---|---|---|---|---|
| 4,645,049 | A | * | 2/1987 | Matsuda et al. | 192/105 B |
| 6,227,342 | B1 | * | 5/2001 | Armbruster et al. | 192/85.57 |
| 6,533,058 | B2 | | 3/2003 | Peter | |
| 6,705,446 | B2 | | 3/2004 | Drussel et al. | |
| 6,814,208 | B2 | | 11/2004 | Drussel et al. | |
| 6,957,730 | B1 | | 10/2005 | Youngwerth | |
| 7,014,026 | B2 | | 3/2006 | Drussell et al. | |
| 7,137,498 | B2 | * | 11/2006 | Gochenour et al. | 192/105 B |
| 7,140,480 | B2 | | 11/2006 | Drussel et al. | |
| 2004/0000443 | A1 | | 1/2004 | Maimone | |
| 2004/0262119 | A1 | * | 12/2004 | Weidinger et al. | 192/105 B |
| 2005/0000775 | A1 | | 1/2005 | Drussel et al. | |
| 2008/0099300 | A1 | * | 5/2008 | Youngwerth et al. | 192/103 A |

FOREIGN PATENT DOCUMENTS
WO 2004061318 A2 7/2004

* cited by examiner

*Primary Examiner* — Rodney Bonck

(57) ABSTRACT

An apparatus and system are disclosed for automatic centrifugal engagement of a pressure plate. The apparatus includes a center clutch coupled rotationally with a transmission input shaft, a clutch basket coupled rotationally with an engine output shaft, and a clutch pack disposed between the center clutch and the clutch basked. The clutch pack includes a plurality of drive plates rotationally coupled to the center clutch and a plurality of friction plates rotationally coupled with the clutch basket. The apparatus also includes a pressure plate assembly that is spring-loaded and disposed between the center clutch and the clutch basket. The pressure plate assembly comprises a pressure plate, a spring plate, and a spring disposed between the pressure plate and the spring plate. The system includes the apparatus and a manual override capable of use with cable actuated and hydraulic actuated clutch levers.

15 Claims, 16 Drawing Sheets

APPARATUS AND SYSTEM FOR AUTOMATIC CENTRIFUGAL ENGAGEMENT OF A PRESSURE PLATE

CROSS-REFERENCES TO RELATED APPLICATIONS

This application is a continuation-in-part of and claims priority to U.S. Provisional Patent Application No. 60/944,721 entitled "APPARATUS AND SYSTEM FOR AUTOMATIC CENTRIFUGAL ENGAGEMENT OF A PRESSURE PLATE" and filed on Jun. 18, 2007 for Albert J. Youngwerth et al., which is incorporated herein by reference.

BACKGROUND OF THE INVENTION

1. Field of the Invention

This invention pertains to the field of clutch engaging/disengaging mechanisms. More particularly, it is a device for automatically engaging or disengaging the clutch based upon engine speed.

2. Description of the Related Art

Most motorcycles incorporate a manual transmission coupled to the engine via a multi-plate clutch assembly. Typically, the multi-plate clutch is engaged/disengaged by the driver via a lever mounted on the handlebar. Although the lever operated clutch allows the driver to control the clutch engagement/disengagement, often, motorcycle drivers find the clutch lever difficult to operate smoothly. New riders have difficulty adjusting to smoothly engaging the clutch while operating the throttle to move the vehicle from a standing start. Additionally, experienced riders may need to partially disengage the clutch when traveling slowly to allow the engine to continue running without stalling. Motorcycle racers often have a difficult time controlling the engagement of the clutch and the application of the throttle to maximize acceleration. In another scenario, Off-road motorcycle racers often need to stop the rear wheel suddenly with the rear brake, causing the engine to stall if the clutch is not first disengaged. An automatic clutch can help overcome many of the problems associated with a manual clutch.

Automatic clutches for motorcycles have existed for more than 10 years, primarily for entry-level motorcycles with low power. More recently, retrofit automatic clutches for high-performance motorcycles have become available. Automatic clutches for high-performance motorcycles have many advantages over manual clutches. Currently available retrofit automatic clutches have several disadvantages. They require replacement of or changes to existing clutch parts. Most motorcycle clutch's pressure plates are spring loaded and attached to the clutch inner hub. However, a centrifugal clutch's pressure plate must spin with the clutch's outer basket which is coupled rotationally to the engine to provide engagement force. Existing retrofit automatic clutches require a modified clutch outer basket to bolt the new centrifugal pressure plate to.

Clutch lever override is not possible at high engine speeds. Existing retrofit automatic clutches use a rigid centrifugal engagement mechanism. To disengage the clutch, the entire force of the centrifugal engagement mechanism must be overcome. At higher engine speeds, the increased centrifugal force of the engagement mechanism becomes difficult or impossible to overcome.

The stock pressure plate provides a fixed amount of pressure to the clutch disks. The stock pressure plate force is limited to ensure the clutch can slip if excessive force is sent through the driveline. Existing retrofit automatic clutches transfer all of the force generated by centrifugal engagement mechanism into the clutch disks. At higher engine speeds, the excess centrifugal force can prevent the clutch from slipping in the event an excessive force is sent through the driveline. The excessive force traveling through the clutch may cause a failure in the engine or transmission.

Existing automatic clutches also do not accommodate the specific needs of high torque motorcycles such as high displacement four stroke motorcycles. Engagement of automatic clutches on motorcycles needs to occur at low speeds without sudden and jerky engagement. Accordingly, a better manner of modulation of engagement of automatic clutches is needed.

Additionally, a need exists for an apparatus that automatically engages and disengages the clutch of a vehicle based upon engine speed while also providing a manual override to disengage the clutch via a driver operated handlebar lever. The driver operated handlebar lever should be able to disengage the clutch at any engine speed without excessive force at high engine speed. Furthermore, the apparatus should limit the total amount of force the centrifugal pressure plate applies to the clutch disks.

SUMMARY OF THE INVENTION

From the foregoing discussion, it should be apparent that a need exists for an apparatus and system for automatically engaging a pressure plate. The present invention has been developed in response to the present state of the art, and in particular, in response to the problems and needs in the art that have not yet been fully solved by currently available automatic clutches. Accordingly, the present invention has been developed to provide an apparatus and system for automatic clutch pressure plate engagement that overcome many or all of the above-discussed shortcomings in the art.

The apparatus is provided with a center clutch coupled rotationally with a transmission input shaft, a clutch basket coupled rotationally with an engine output shaft, and a clutch pack disposed between the center clutch and the clutch basked, the clutch pack comprising a plurality of drive plates rotationally coupled to the center clutch and a plurality of friction plates rotationally coupled with the clutch basket. The apparatus also includes a pressure plate assembly that is spring-loaded and disposed between the center clutch and the clutch basket. The pressure plate assembly comprises a pressure plate, a spring plate, and a spring disposed between the pressure plate and the spring plate.

The spring plate is further configured with a snap ring groove configured to engage a snap ring, wherein the snap ring is configured to limit the axial movement of the pressure plate relative to the spring plate and preload the spring. The spring, in one embodiment, is a wave spring preloaded with a force in the range of between about 100 and 600 pounds.

In one embodiment, the pressure plate comprises a plurality of ramps positioned radially around the perimeter of the pressure plate, each ramp configured to maintain one centrifugal actuating member. The centrifugal actuating member may be selected from a group consisting of ball bearings, needle bearings, roller bearings, and tapered roller bearings. In a further embodiment, the ramps comprise a first incline portion and a second incline portion, the first incline portion having an angle greater than the second incline portion and extending for a length sufficient to allow the centrifugal actuating member to cause at least partial clutch engagement while on the first incline portion.

In one embodiment, the apparatus also includes a manual override configured to enable manual override of clutch engagement, the manual override comprising a cable actuated clutch lever coupled with a throw-out assembly. The throw-out assembly is configured to axially move a top plate and disengage the clutch. Furthermore, a wave spring may be disposed between a rotating standoff hub and the throw-out and configured to provide a force that maintains the actuated clutch lever in a disengaged position.

Alternatively, the apparatus may include a manual override configured to enable manual override of clutch engagement using a hydraulic actuated clutch lever. The hydraulic actuated clutch lever is coupled with a throw-out assembly. In one embodiment, the throw-out assembly comprises a snap ring rigidly coupled with the center clutch and a spring thrust washer disposed between the snap ring and the center clutch.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
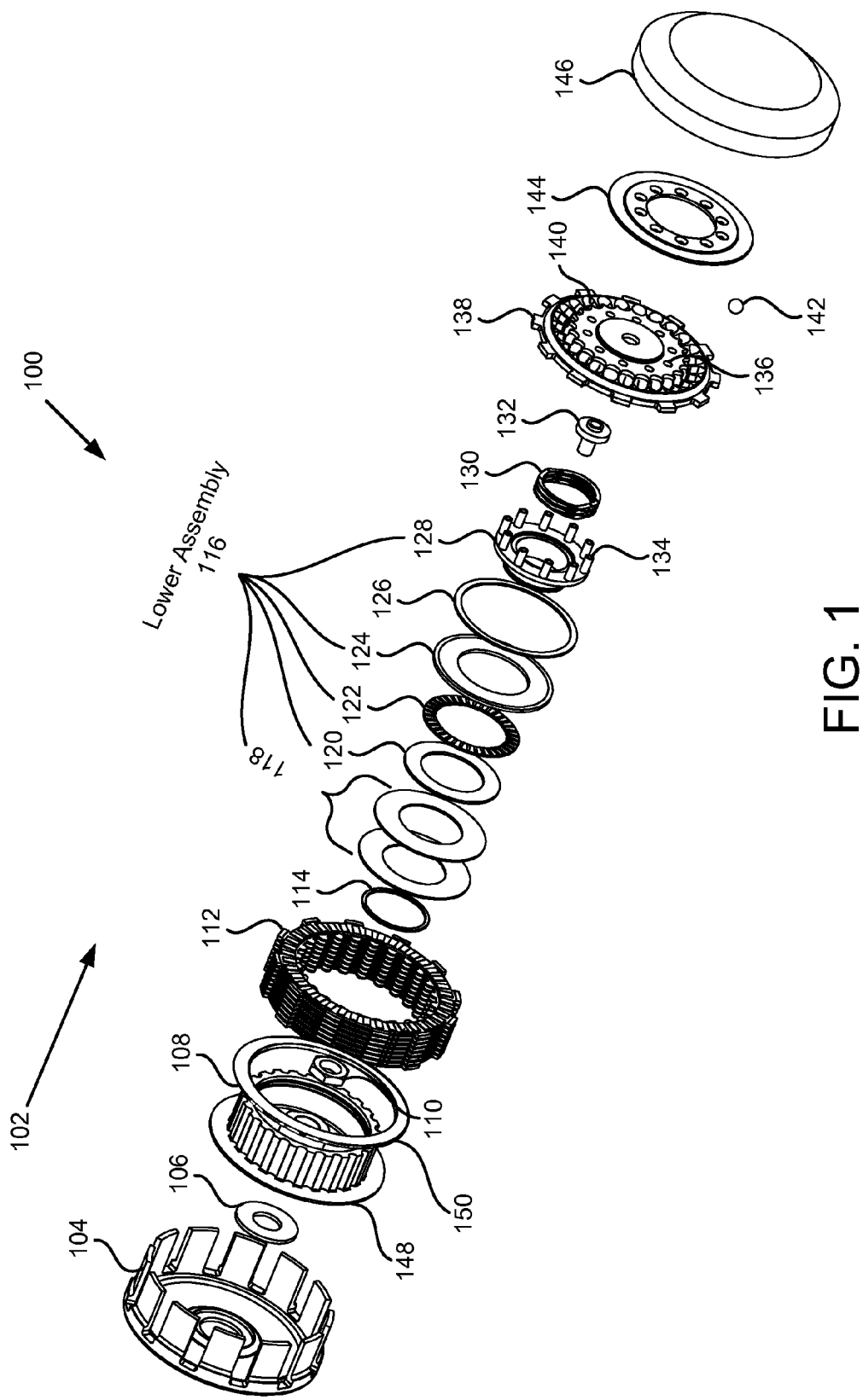
FIG. 1 is an isometric exploded view diagram illustrating an embodiment of a clutch apparatus in accordance with the present invention.

FIG. 1 is an isometric exploded view diagram illustrating an embodiment of a clutch apparatus (hereinafter "clutch") 100 in accordance with the present invention. For clarity purposes, reference will be made to "outward" and "inward" directions. As used herein, the term "outward" refers to a direction pointing away from the transmission input shaft or towards a clutch cover (See clutch cover 146). Arrow 102 illustrates this outward direction. The term "outward direction" may also refer to a radial direction pointing away from a longitudinal axis. As used herein "inward" refers to the opposite direction of "outward."

The clutch 100 is provided with, in one embodiment, a clutch basket 104 having an opening in the center for engaging the transmission input shaft (not shown). The transmission output shaft extends through a center clutch thrust washer 106 and into a center clutch 108. A center clutch nut 110 secures the center clutch 108, center clutch thrust washer 106, and the clutch basket 104 to the transmission output shaft.

A clutch pack 112 comprising drive and friction plates is also depicted. In one embodiment, the clutch pack 112 intermeshes drive and friction plates that when compressed are rotationally coupled and when uncompressed are free to rotate independent of each other. Alternatively, the clutch pack 112 may comprise any compressible mechanism that when compressed is rotationally coupled. The above described components (with respect to FIG. 1) are common and found in most motorcycle clutch assemblies. However, the described invention may also be adapted to function in any vehicle that utilizes an engine and a transmission.

The clutch 100 also includes a retaining snap ring 114 configured to retain the lower assembly 116. In one embodiment, the lower assembly 116 is provided with at least one Belleville spring 118, a lower thrust 120, a thrust bearing 122, an upper thrust 124, and a rotating hub 128. The clutch 100 also includes a retaining ring 126, a wave spring 130, and an optional clutch lifter 132.

The rotating hub 128 may be formed with a plurality of standoffs 134 that are arranged radially around the outer edge of the rotating hub 128. The standoffs 134 are configured to pass through a plurality of openings 136 in a pressure plate 138 and are secured to the pressure plate 138 with screws 210. The pressure plate 138 includes a plurality of ramps positioned radially around the outer perimeter of the pressure plate. Alternatively, the ramps 140 may be formed in the surface of a top plate 144 that faces the pressure plate 138. The ramps 140 will be discussed in greater detail below with reference to FIGS. 3 and 4.

Each ramp 140 of the pressure plate 138 is configured to maintain one centrifugal actuating member. In one embodiment, the centrifugal actuating member may comprise a ball 142. Alternatively, other centrifugal actuating members capable of being implemented in the present invention include, but are not limited to, a ball bearing, a needle bearing, a roller bearing, or a tapered roller bearing. The clutch 100, in a further embodiment, is provided with a top plate 144 configured to maintain the balls 142 within each respective ramp 140. Additionally, the clutch 100 may include a clutch cover 146 configured to bolt or otherwise attach to the motor and protect the components of the clutch 100.

The clutch 100 functions to transfer torque from the motor to the drive system (i.e. a rear wheel of a motorcycle). The described clutch 100 is speed sensitive. In other words, at a certain predetermined rotating speed, the balls 142 provide a clamping force on the clutch pack 112, thereby engaging the motorcycle or vehicle. As the pressure plate 138 spins, the balls 142 move from a resting position closer to the center of the pressure plate 138 to a position closer to the perimeter of the pressure plate 138. The incline of the ramps together with the top plate 144 cause the balls 142 to push "outward" on the top plate and inward on the pressure plate and subsequently the clutch pack 112. When the clutch pack 112 is compressed sufficiently to eliminate substantial slippage, the motor is engaged. In one embodiment, the wave spring 130 provides a biasing force against the pressure plate 138 to resist engagement until a predetermined RPM is reached.

One characteristic of an installed clutch 100 assembly is the "installed gap," which refers to the amount of slack between the pressure plate 138 and the clutch pack 112 when the clutch 100 is disengaged. If the installed gap is too great, the balls 142 will reach the end of the ramp, and the clutch will continually slip, never really engaging the motor. Alternatively, if the gap is too small, the clutch will continually drag and not disengage the motor. The axial distance (inward and outward) that the balls 142 travel is selected to be slightly greater than the maximum installed gap in order to generate an appropriate clamping force in the clutch pack 112. For example, in order to accommodate a reasonable amount of wear and a minimum installed gap to prevent clutch drag, the axial distance may be in the range of between about 0.040" and about 0.090".

Conventional centrifugal clutches are prone to generating too much force and "over-clamping" the clutch pack. This can result in excessive wear and possibly catastrophic failure. To overcome this problem, the clutch 100 includes at least one pre-compressed force limiting spring. The use of the force limiting spring allows the top plate 144 to be substantially rigid, and only the smallest amount of vertical travel in the ramp 140 is required to engage the clutch pack 112. This is because the top plate 144 does not move and the force limiting spring will not move until a force is applied that is greater than the pre-compression of the spring.

The spring is in the depicted embodiment a Belleville spring 118 and is disposed between the lower thrust 120 and the clutch pack 112. Of course, the Belleville spring 118 could be located at other locations in the clutch 100 and still accomplish its purpose. The Belleville spring 118 is, in the depicted embodiment, essentially a cupped spring washer. The Belleville spring 118 may have a slight conical shape to assist in providing spring-like characteristics. Additionally, the Belleville spring 118 is in one embodiment selected to exhibit non-linear spring characteristics.

One beneficial characteristic of the Belleville spring 118 is the small deflection distance required to achieve high spring loads. Consequently, Belleville springs minimize the axial space required to achieve the required spring loads. In one embodiment, the Belleville spring 118 may be pre-compressed. In another embodiment, the Belleville spring is pre-compressed to between about 100 and about 600 pounds. In a further embodiment, the Belleville spring is compressed to between about 200 and about 400 pounds. In one embodiment, the Belleville spring is compressed to provide a clamping force that allows the clutch pack to transfer not substantially more than the peak torque of the engine.

The top plate 144 is restrained axially by the rotating hub, which in turn is restrained axially by the center clutch snap ring 114 through the upper thrust 124, the thrust bearing 122, the lower thrust 120, Belleville springs 118, and the rotating hub 128. When an outward axial force is applied, the Belleville springs 118 begin to deflect, but will not "give" or allow the clutch pack 112 to be compressed until the force is greater than the pre-compression of the Belleville springs 118.

Another beneficial characteristic of the Belleville springs 118 is that when the height-to-thickness ratio is greater than a certain amount, the force required to deflect the Belleville spring 118 is very non-linear. For example, the load required to deflect the Belleville spring increases greatly through the first 50% of deflection but does not increase greatly through the final 50% of deflection is not required to increase greatly. Applied to the clutch 100, a Belleville spring 118 that is pre-compressed, for example 50%, enables a clamping force to remain very constant over a wide range of installed gaps.

In a further embodiment, the clutch 100 may be provided with a modulating spring disposed between the clutch pack 112 and a flange 148 of the center clutch 108. The modulating spring, in one example, is a third Belleville spring 150 having a preselected deflection force. A modulating spring 150 configured with a relatively low deflection force together with multi-angle ramps (see FIGS. 3 and 4) result in a smooth engagement and transition to full engagement. Alternatively, the modulating spring 150 may be disposed anywhere in the clutch 100 assembly. For example, the modulating spring 150 may be located anywhere between inward and outward axial locating surfaces of the clutch, where the inward locating surface is the flange 148 and the outward axial locating surface forms the underside or inward facing surface of the lower assembly snap ring.

Figure 2:
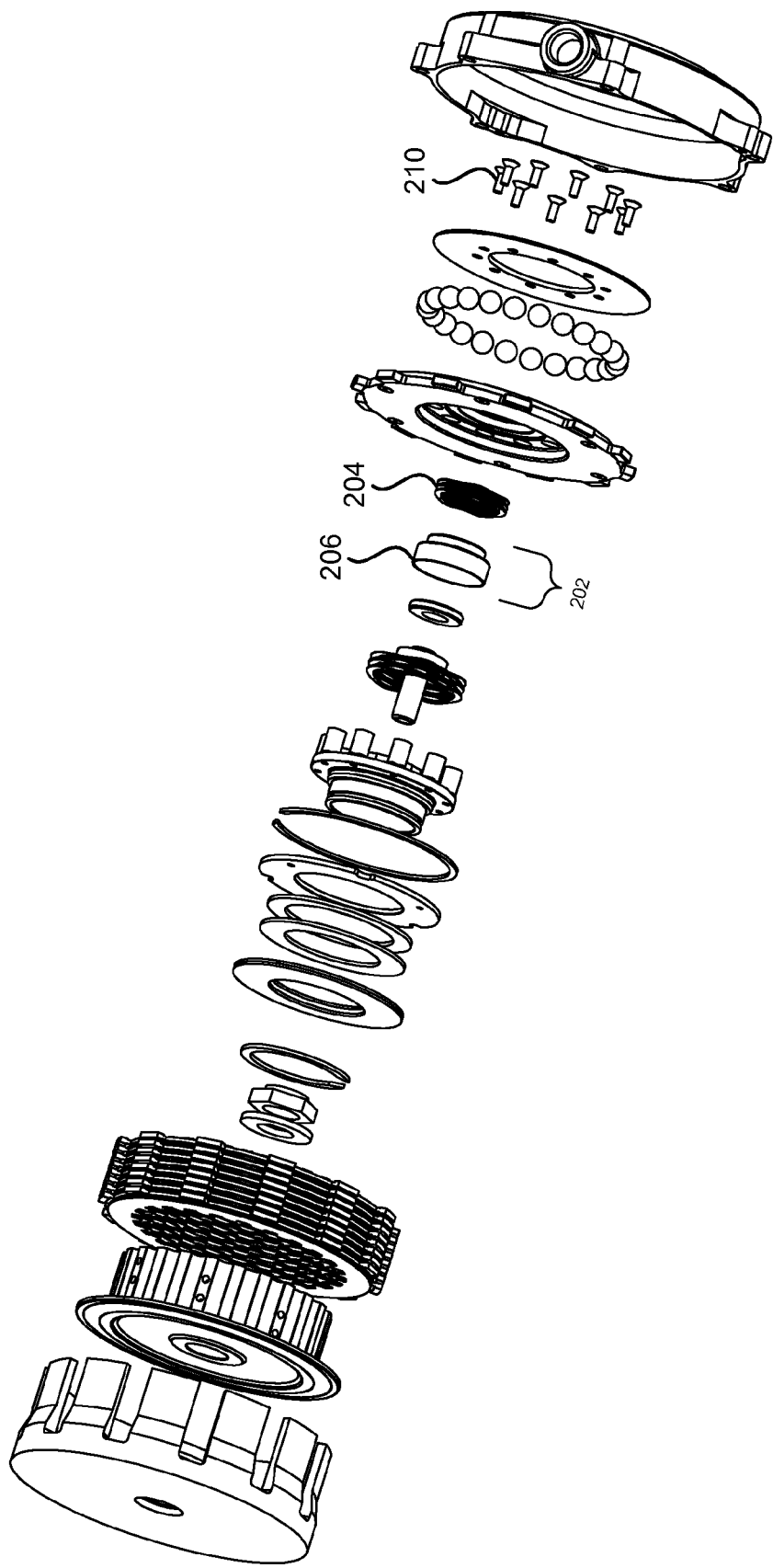
FIG. 2 is an isometric exploded view diagram illustrating another embodiment of a clutch in accordance with the present invention.

FIG. 2 is an isometric exploded view diagram illustrating another embodiment of a clutch 200 in accordance with the present invention. In one embodiment, the clutch 200 may be configured with a spring retainer 202. The spring retainer 202 is configured to maintain the clutch lever in an extended position when the clutch is not automatically engaged. Essentially, this configuration maintains proper tension on the clutch lever and prevents the clutch lever from "flopping." The spring retainer 202 is provided with an inwardly extending skirt 206 configured to extend past the rotating hub 128 and redirect oil. Benefits of redirecting the oil inward towards the clutch basket include, but are not limited to, reducing wear and improving cooling.

Figure 3:
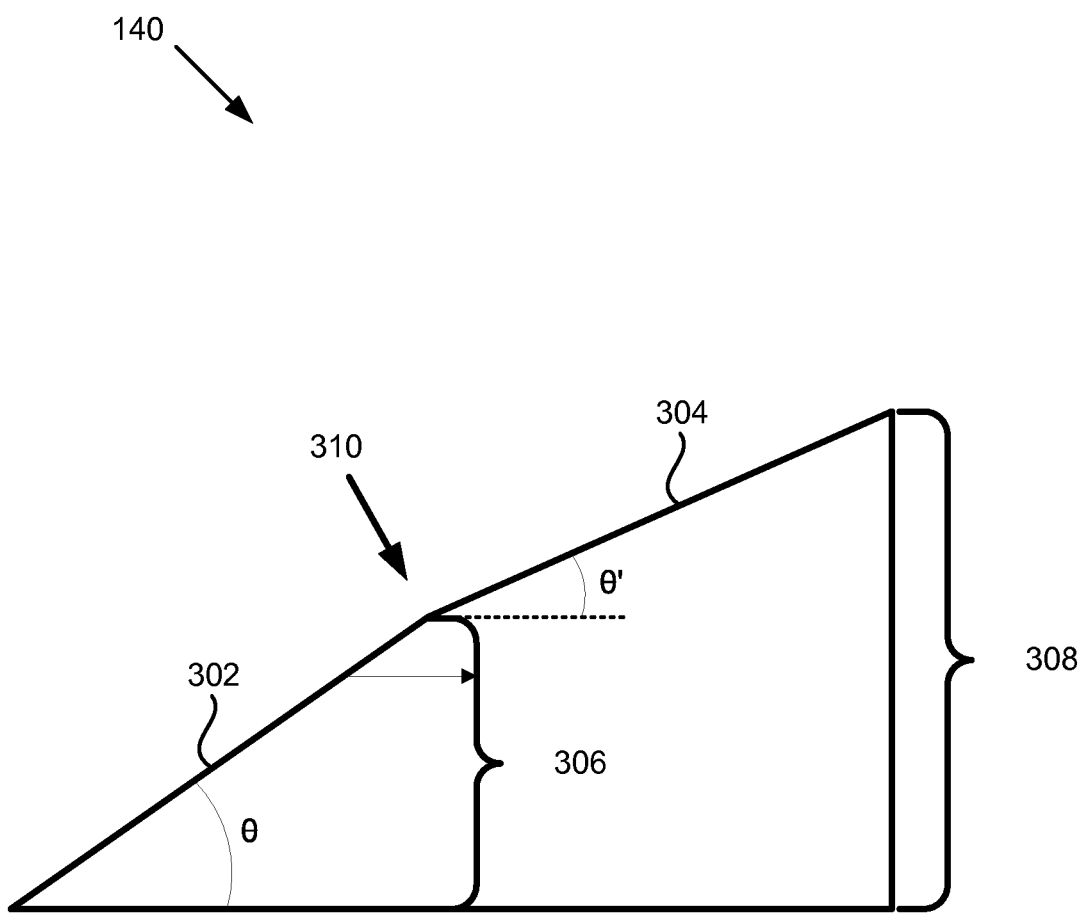
FIG. 3 is a schematic diagram illustrating a cross-sectional view of a ramp in accordance with the present invention.

FIG. 3 is a schematic diagram illustrating a cross-sectional view of a ramp 140 in accordance with the present invention. In one embodiment, the ramp 140 includes a first incline 302 having a first selected angle and a second incline 304 connected with the first incline 302 and extending at a second selected angle. Alternatively, the ramp 140 may comprise a single incline. The first incline 302 also is defined by a selected height 306. Likewise, the second incline 304 may be defined by a height 308. The initial height 306 may have a length selected to not substantially effect clutch pack clamping. That is, the initial angle θ may extend for a length 306 that ends just before the clutch pack 112 begins to clamp.

In a further embodiment, the first incline 302 has an initial angle θ and extends for a distance 306 selected to cause partial clamping of the clutch pack 112 but not a full clamping force and load. In a third embodiment, the initial angle θ is selected to extend until full clamping force has occurred, and the second angle θ' extends thereafter. Of course, any distances can be selected and can be altered to cause an optimal clamping, whether for smoother take-off, or less or greater slippage. As depicted, the inclines 302, 304 are substantially linear. Alternatively, non-linear incline portions are also contemplated.

In one embodiment, the first incline 302 has a greater angle θ than the angle θ' of the second incline 304. Such an arrangement allows for a smooth take-off as the balls travel up the steeper first incline 302 at a slower rate relative to the increasing RPM of the engine and then a much quicker generation of clamping force as the balls pass a transition point 310 and travel through the second incline 304. In one example, the first incline 302 has an angle θ in the range of between about 18 and about 70 degrees, and the second incline 404 has an angle θ' in the range of between about 8 and about 20 degrees. Other suitable combinations of angles θ and θ' include, but are not limited to about 35 and 24 degrees, and about 18 and 10 degrees.

Figure 4:
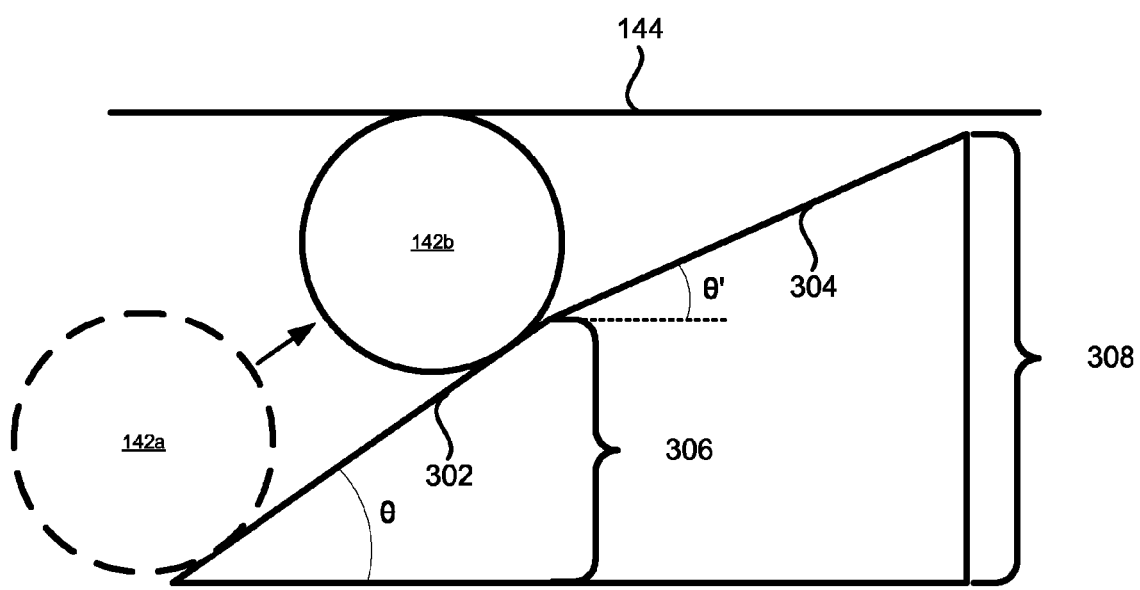
FIG. 4 is a schematic diagram illustrating a cross-sectional view of a ramp having a ball traveling upward in accordance with the present invention.

FIG. 4 is a schematic diagram illustrating a cross-sectional view of a ramp 140 having a ball 142 traveling upward in accordance with the present invention. FIG. 4 illustrates a ball 142a in a home position. As used herein, the term "home position" refers to the position a ball 142 returns to when the pressure plate is spinning at a speed below which the balls are generating enough force to overcome the pre-compressed wave spring 130. In one embodiment, this force is between about 5 and about 65 pounds.

With reference to FIGS. 3 and 4, the term upward refers to a position on the ramp higher than that of the ball 142a. For clarity, the term 'upward' with regard to FIGS. 3 and 4 is equivalent to a position farther 'outward' axially when referring to the embodiment of FIGS. 1 and 2.

As the speed of rotation of the pressure plate increases, the ball 142a moves from the home position along the first incline 302 until the pressure plate makes contact, as shown by ball 142b, with the clutch pack. As the ball 142b is sandwiched between the top plate 144 and the ramp 140, an 'inward' or clamping force is generated by the ball 142b. However, the clutch 100 does not engage or begin to engage until the clamping force is sufficient to overcome the wave spring 130.

As the ball 142b ascends the ramp due to radial centrifugal force of the balls, the axial force increases. The first path of "least resistance," is the wave spring 130. The axial force generated by the balls overcomes the wave spring 130, causing the pressure plate 138 to move inward towards the clutch pack 112. Once the clutch pack 112 is engaged and the force is sufficient to overcome the modulating spring 150, the next path of "least resistance" is the force limiting Belleville spring 118. Once the balls have generated enough axial force to overcome the force limiting Belleville spring 118, the top plate 144 may move axially in the outward direction until the ball reaches the end of the ramps.

In another embodiment, the manual lever (not shown) may be implemented to relieve pressure on the clutch assembly. The clutch lever can be used to displace the pressure plate in an outward direction to manually disengage the clutch. In order to enable a manual clutch lever, the travel of the Belleville springs 118 is selected such that once the balls 142 have reached the ends of the ramps there is still travel left in the springs. If there is little or no travel left, the clutch lever will not be able to displace the pressure plate in the outward direction.

The following specific embodiment is given herein by way of example only. The numbers given are examples only and are not to be understood as the only operating parameters under which the clutch 100 of the present invention will function properly. In this example, the clutch 100 is installed in a street motorcycle having a large displacement motor on the order of 800-1500 cc's.

In this example, at 1000 RPM the motorcycle is at idle. The wave spring 130 supplies approximately 50 pounds of force. At 1000 RPM, the balls 142 generate approximately 45 pounds of force, which is not enough to compress the wave spring 130. The balls remain at the position illustrated by ball 142a.

At 1100 RPM, the balls generate approximately 52 pounds of force. The wave spring 130 is overcome and the pressure plate 138 begins to push on the clutch pack 112. The balls 142b are still in the first incline 302 area. At 1200 RPM the modulating spring 150 is beginning to deflect or compress. In this example, at 1200 RPM the balls 142b generates 65 pounds of force. The wave spring 130 absorbs 50 pounds, therefore 15 pounds are being applied to the clutch pack 112. The motorcycle is now moving.

At 1300 RPM, the balls generate approximately 80 pounds of force, enough to compress the modulating spring 150. In this example in which the install gap is 0.0030", the balls travel upward 0.0010 of an inch before the pressure plate engages the clutch pack. In this example, the height 306 of the first incline 302 is 0.0050 of an inch. Also in this example, the modulating spring 150 is configured to compress 0.0020 of an inch. In this example, therefore, when the modulating spring 150 is compressed the ball has reached the transition point 310 (0.0030 of install gap+0.0020 compression=0.0050, also the height 306) and begins to move into the second incline 304 area. Clamping force is generated much more quickly due to the lower angle, and the motorcycle can quickly accelerate.

Once greater than 300 pounds of force is generated, the Belleville springs 118 compress, allowing the top plate 144 to move outward, until the balls reach the end of their ramps, limiting the amount of pressure on the clutch pack 112.

Figure 5:
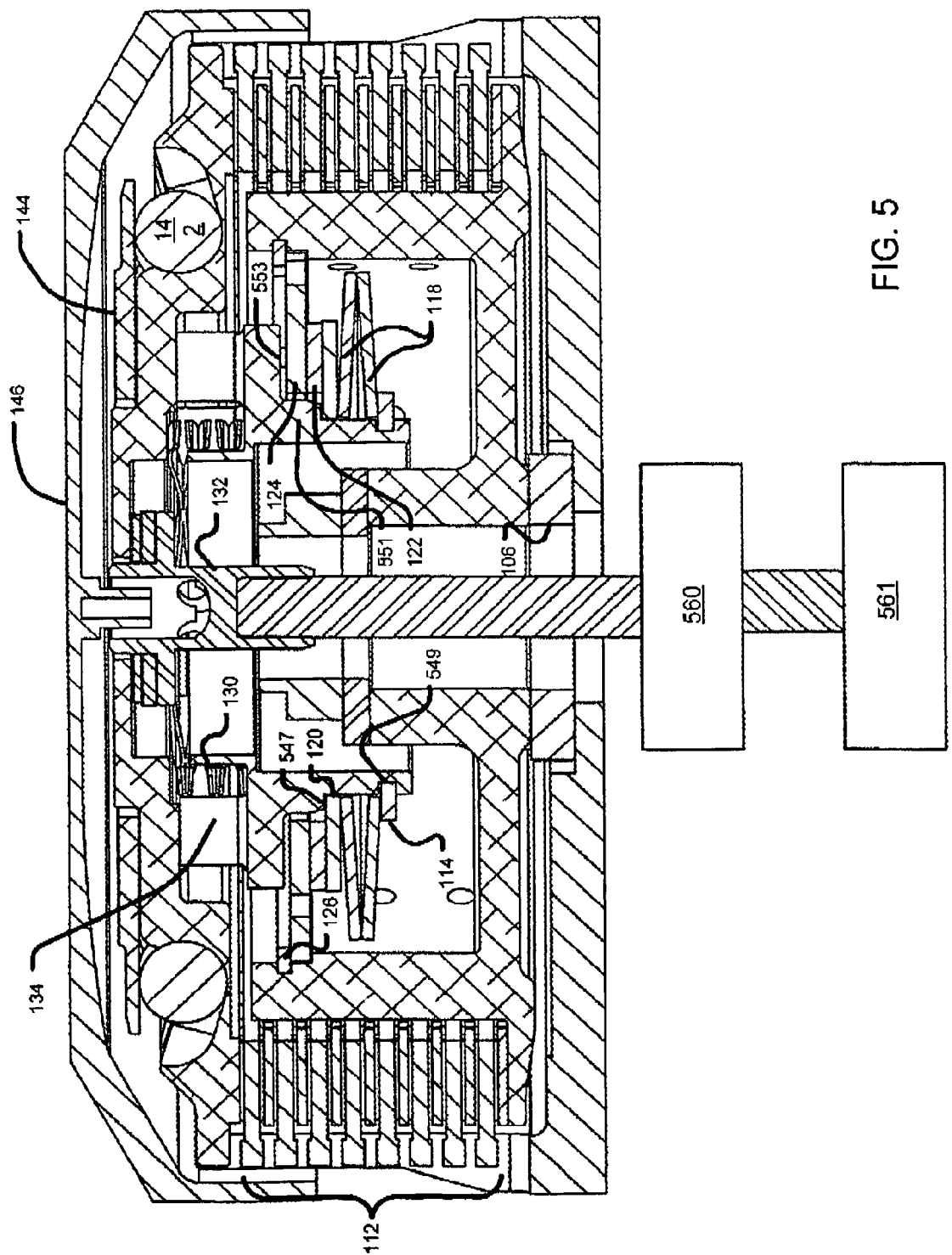
FIG. 5 is a cross-sectional view of one embodiment of the clutch in accordance with the present invention.

FIG. 5 is a cross-sectional view of one embodiment of the clutch 100 in accordance with the present invention. The components in FIG. 5 are substantially equivalent to the components of FIG. 1, and although depicted herein in a certain arrangement, may be arranged in other manners while still accomplishing the same purpose. In one embodiment, the lower assembly is provided with of a rotating hub 134, an upper thrust 124, thrust bearing 122, lower thrust 120, at least one Belleville spring 118 and rotating hub snap ring 114. The position of a clutch lever 561 and cable adjuster 560 relative to the clutch lifter can be seen in FIG. 5.

In a further embodiment, the lower assembly 116 is assembled such that the upper thrust 124 is disposed over the rotating hub shaft 551 followed by the thrust bearing 122 and the lower thrust 120. Two Belleville springs 118 maybe disposed above the rotating hub snap ring 114. To locate the rotating hub snap ring 114 into the rotating hub snap ring groove 549, the Belleville springs 118 must be compressed into the lower thrust 120. The lower thrust 120 is restrained axially in the outward direction by the rotating hub lower thrust locating surface 547. When the rotating hub snap ring 114 is located into the rotating hub snap ring groove, the Belleville springs 118 are pre-compressed. The upper thrust 124 and upper thrust bearing 122 slightly float between the lower thrust and the rotating hub upper thrust locating surface 553. In one embodiment, the pre-compressed force of the Belleville springs 118 is in the range of between about 200 and 600 pounds. In an alternative embodiment, the pre-compressed or preloaded force is about 300 pounds.

Figure 6A:
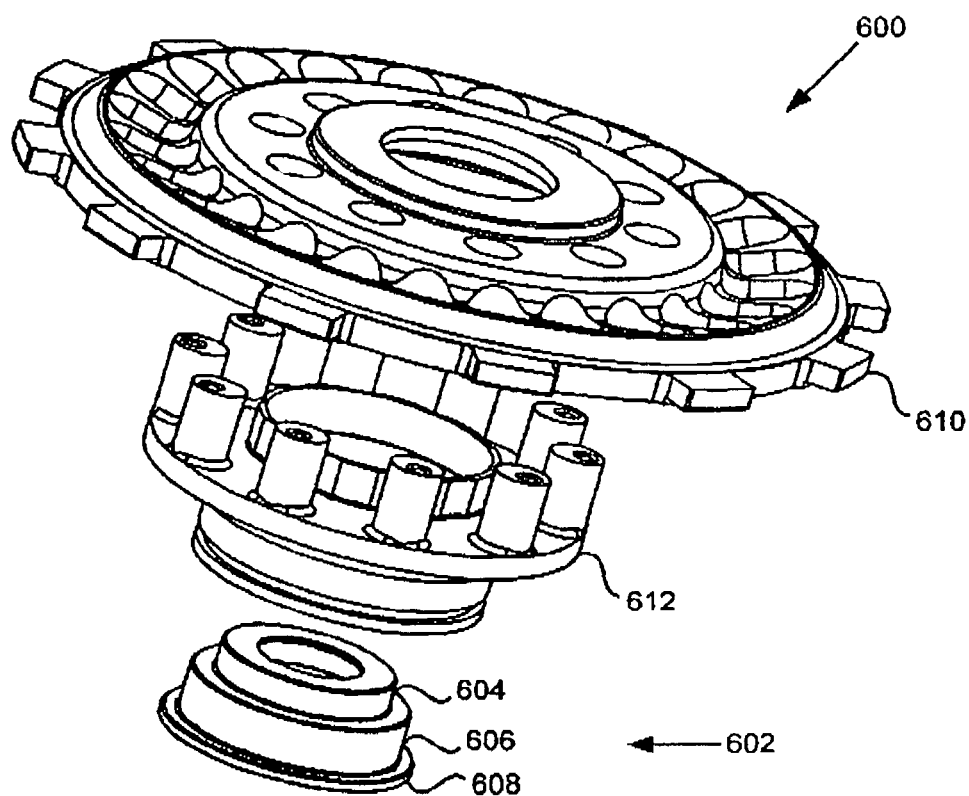
FIG. 6a is a partial exploded view diagram illustrating one embodiment of a clutch capable of automatic and manual modes in accordance with the present invention.

FIG. 6a is a partial exploded view diagram illustrating one embodiment of a clutch 600 capable of automatic and manual modes in accordance with the present invention. The clutch 600, in one embodiment, is provided with a rotating hub lifter 602. For purposes of clarity many components of the clutch have been omitted from FIGS. 6a and 6b because the components have been illustrated and described above with reference to FIGS. 1-5. In certain embodiments, the rotating hub lifter 602 may replace the spring retainer 202 of FIG. 2. The rotating hub lifter 602 is formed by an upper portion 604, a lower portion 606, and a lip 608. Together, the upper and lower portions 604, 606 interface with openings in the pressure plate 610 and the rotating hub 612 respectively.

The rotating hub lifter 602 is configured to slideably engage the pressure plate 610 and axially position the rotating hub 612 in either an automatic clutch mode or a manual clutch mode. Further discussion will be given below with reference to FIGS. 6b-10.

Figure 6B:
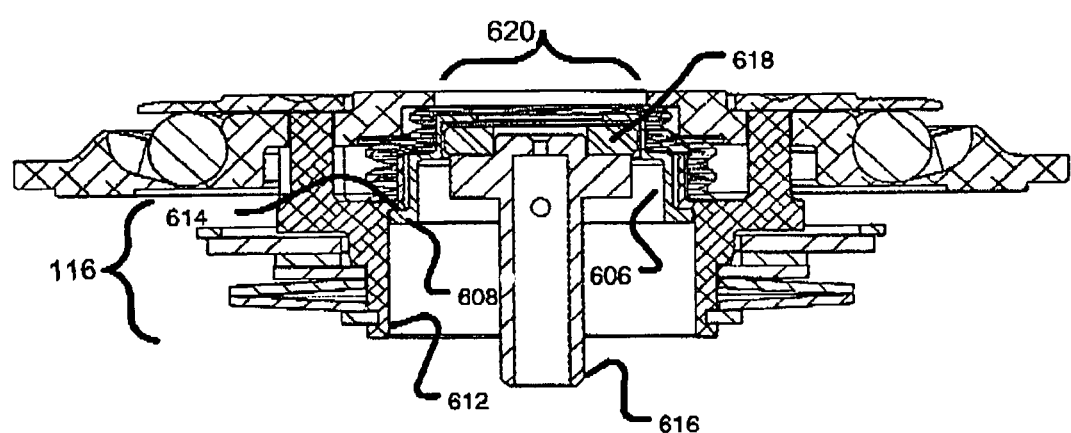
FIG. 6b is a partial cross-section diagram illustrating another embodiment of the clutch in accordance with the present invention.

FIG. 6b is a partial cross-section diagram illustrating another embodiment of the clutch 600 in accordance with the present invention. In one embodiment, the lip 608 of the rotating hub lifter 602 engages an inner surface 614 of the rotating hub 612 in order to axially position the rotating hub 612. This may be accomplished by axial movement of the clutch lifter 616. The clutch lifter 616 may be mechanically or fluidly connected with a clutch lever of a motorcycle, for example.

In a further embodiment, the clutch 600 includes a clutch lifter spacer 618. The dimensions of the clutch lifter 616 are not uniform across motorcycle/atv manufacturers (and even among models of a manufacturer), therefore, the clutch lifter spacer 618 may be formed with a width selected to accommodate a specific clutch lifter 616. The pressure plate 610 may be provided with an opening 620 configured to receive the upper portion 604 of the rotating hub lifter 602. As such, the pressure plate 610 may travel downward past the rotating hub lifter to provide a clamping force on the clutch pack as described above.

Figure 7:
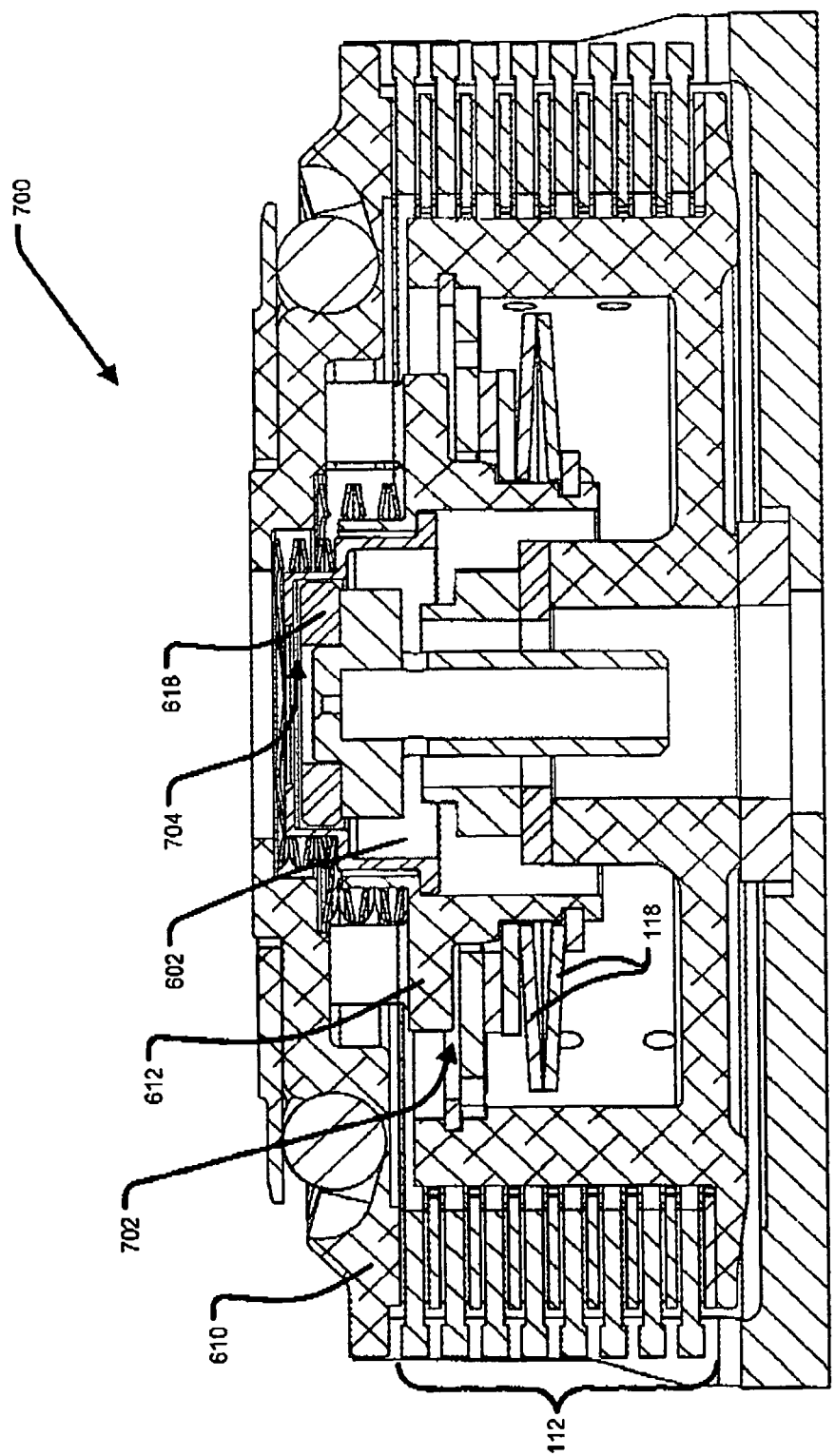
FIG. 7 is a cross-section diagram illustrating another embodiment of the clutch in accordance with the present invention.

FIG. 7 is a cross-section diagram illustrating another embodiment of the clutch 700 in accordance with the present invention. As described above, the clutch 700 is configured to enable both an automatic mode and a manual mode by adjusting the axial position of the rotating hub 612. Conversely, traditional automatic clutches achieved manual override of the automatic clutch by applying a force to the pressure plate. Furthermore, the traditional automatic clutches are not capable of operation in a manual mode, only manual override of an automatic mode. As such, the depicted clutch 700 beneficially allows an operator to quickly switch between automatic mode and manual mode. In one embodiment, selecting automatic or manual mode is accomplished by adjusting the stock cable adjuster on the clutch lever. In other words, adjusting the "free play" of the cable positions the rotating hub 612 into "automatic mode" or "manual mode."

Conventionally, automatic clutches are installed with an "install gap" of a predetermined distance (typically on the order of thousandths of an inch). Over time, wear of the clutch pack causes the install gap to increase. As described above, in order for the pressure plate to generate a clamping force, the balls move an axial distance greater than the install gap. As a result of wear, the install gap may become greater than the height of the ramp (see FIGS. 3 and 4) and therefore the automatic clutch becomes ineffective.

Conversely, the clutch 700 of the present invention is configured such that the installed gap is adjustable by positioning of the clutch lifter 616. As the screws 210 are installed through the top plate and into the rotating hub, the pressure plate 610 compresses the clutch pack 112, lifts the rotating hub 612, and partially compresses the Belleville springs 118. FIG. 7 illustrates one example of the clutch 700 in manual mode with the balls in a "home position" (see FIG. 4).

In "manual mode," the clutch 700 has a gap 704 between the clutch lifter spacer 618 and the rotating hub lifter 602, and an increasing gap 702 between the rotating hub 612 and the lower assembly. Furthermore, in manual mode there is no gap between the pressure plate 610 and the clutch pack 112.

Figure 8:
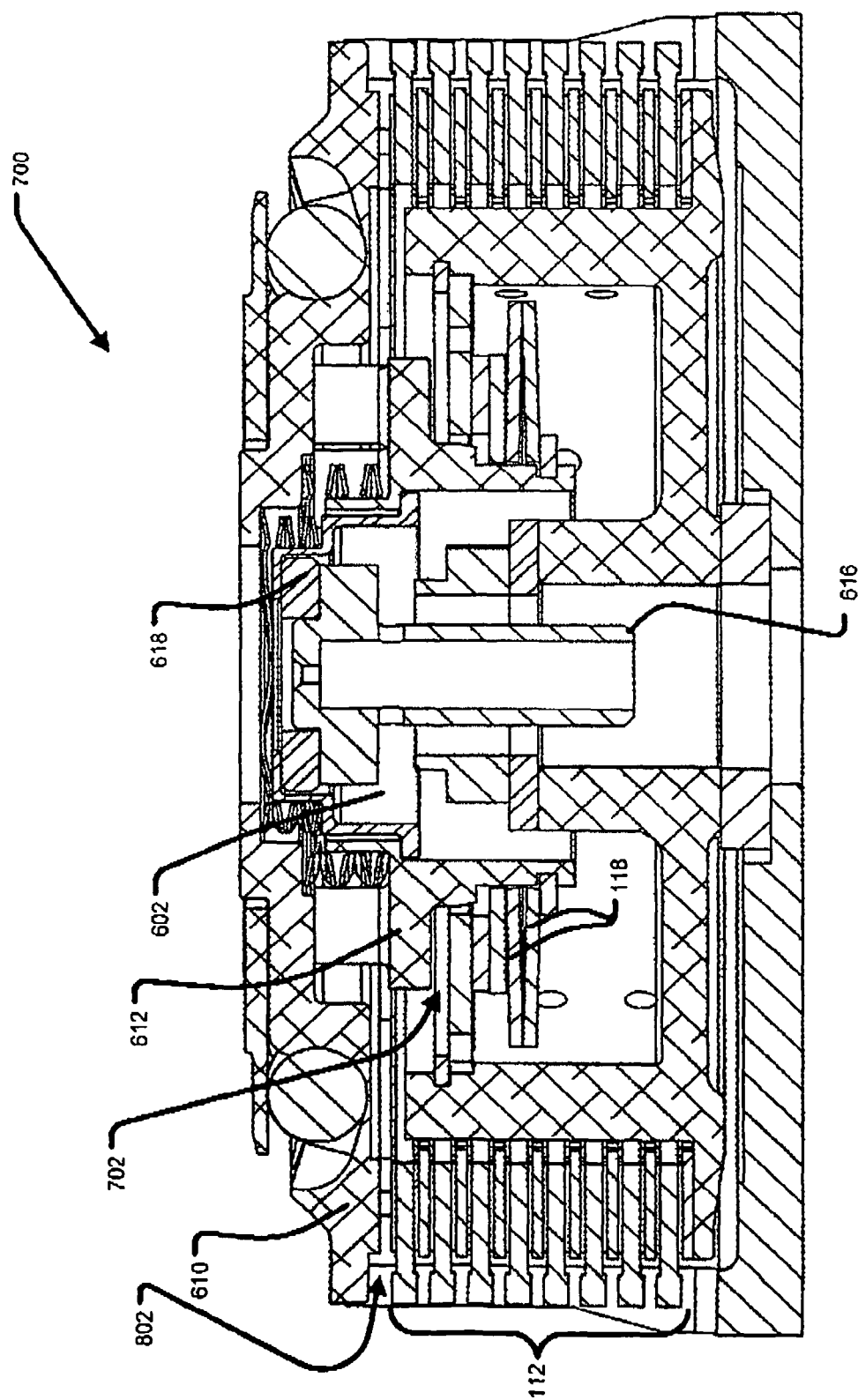
FIG. 8 is a cross section diagram illustrating the clutch in an automatic mode in accordance with the present invention.

FIG. 8 is a cross section diagram illustrating the clutch 700 in an automatic mode in accordance with the present invention. In the depicted embodiment, the balls 142 are in a "home position" indicating a clutch that is not engaged. Additionally, in automatic mode the clutch lifter 616 is in an axial position such that there is no gap between the clutch lifter spacer 618 and the rotating hub lifter 602. The lifted or raised clutch lifter 616 pushes outward on the rotating hub lifter 602 which subsequently lifts the rotating hub 612 and the pressure plate 610, thereby forming a gap 802 between the pressure plate 610 and the clutch pack 112. This configuration also results in further compressing of the Belleville Springs 118, and a bigger gap 702 between the rotating hub and the lower clutch assembly.

Figure 9:
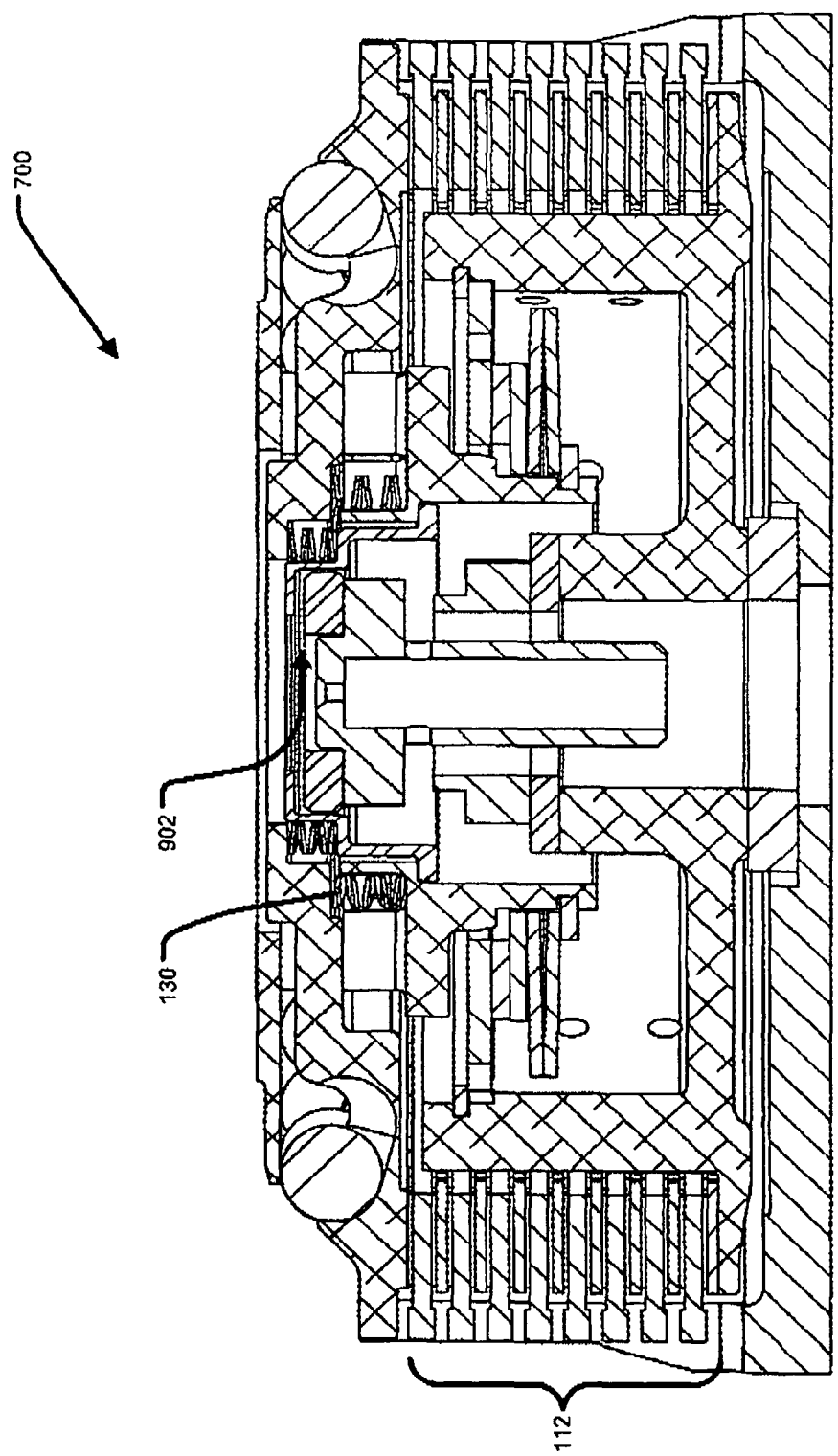
FIG. 9 is a cross section diagram illustrating the clutch in an engaged mode in accordance with the present invention.

FIG. 9 is a cross section diagram illustrating the clutch 700 in an engaged mode in accordance with the present invention. As depicted, the balls 142 are at the end of each ramp and therefore the pressure plate 610 is engaging the clutch pack 112. In a further embodiment, the clutch lifter 616 is positioned such that there is a gap 902 between the clutch lifter spacer 618 and the rotating hub lifter 602.

Figure 10:
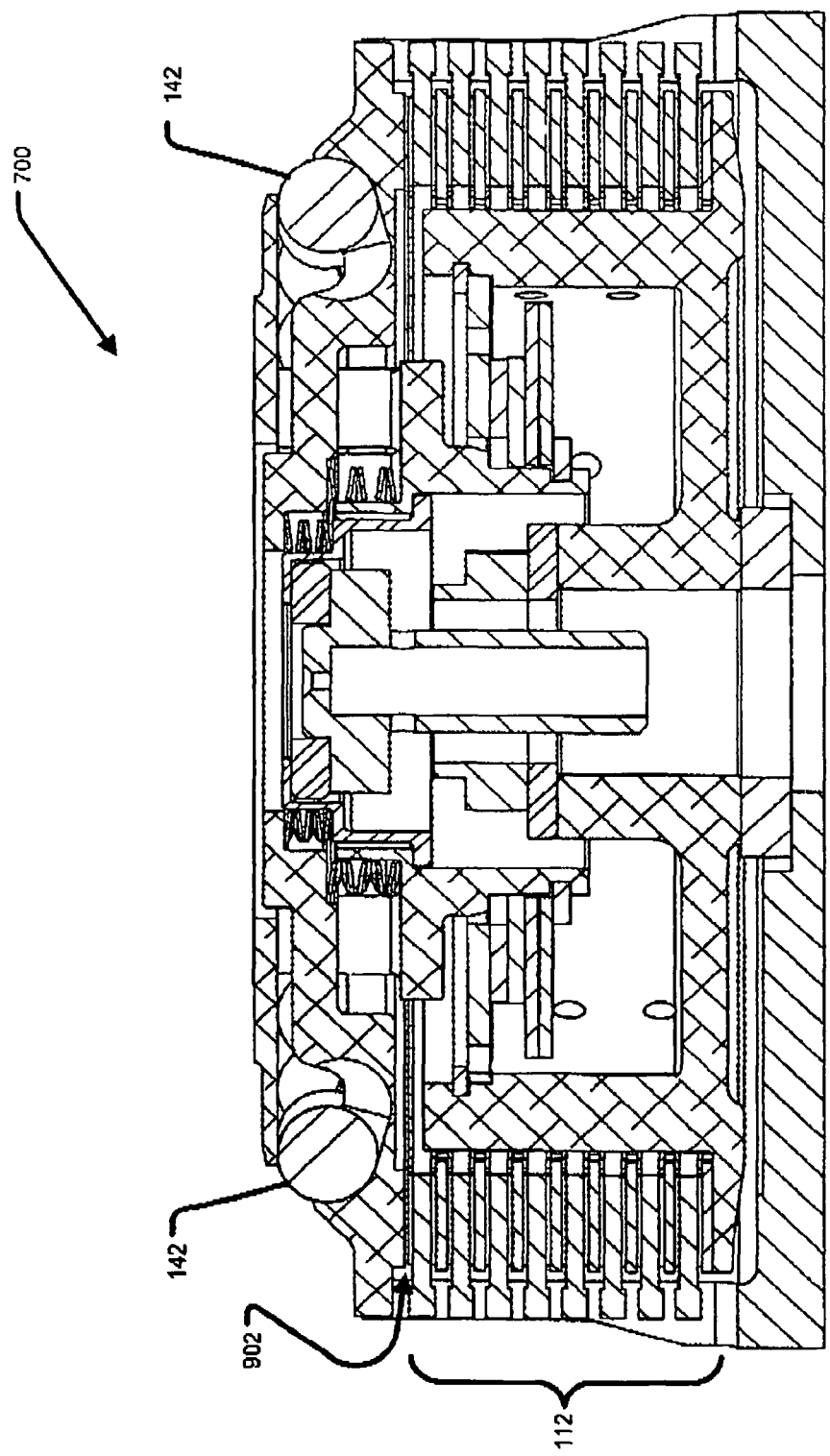
FIG. 10 is a cross section diagram illustrating the clutch in a disengaged mode in accordance with the present invention.

FIG. 10 is a cross section diagram illustrating the clutch 700 in a disengaged mode in accordance with the present invention. In the depicted embodiment, the balls are in an engaged position, however the clutch lifter 616 is lifting the rotating hub lifter 602 and subsequently lifting the rotating hub 612 which in turn lifts the pressure plate 610. As such, a gap 1010 is formed between the pressure plate 610 and the clutch pack 112 and although the balls 142 are in a "force generating" position, the balls have travelled to their stopping point in the ramps, preventing the pressure plate from travelling further to engage the clutch pack 112.

Figure 11:
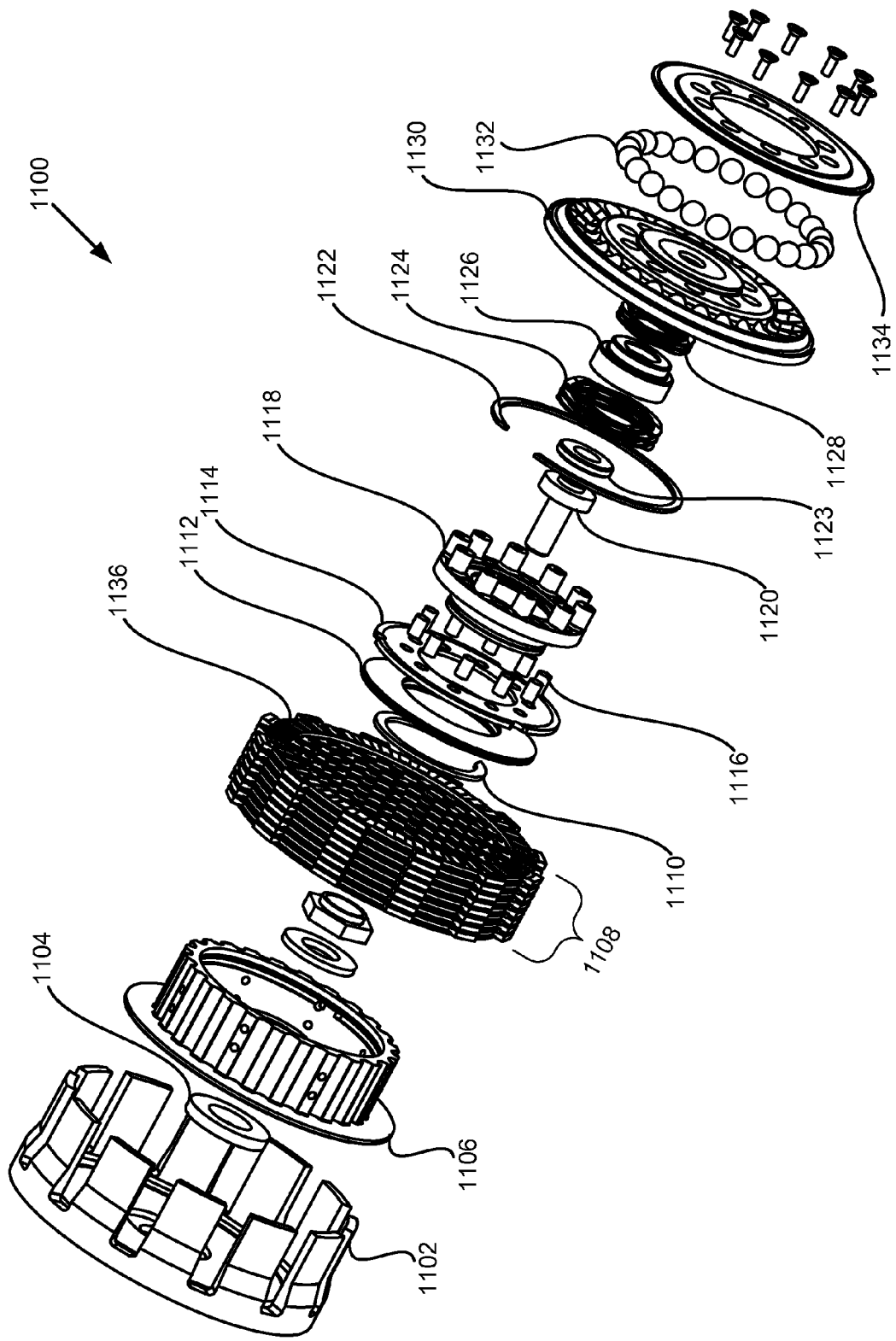
FIG. 11 is an isometric exploded view diagram illustrating another embodiment of a clutch in accordance with the present invention.

FIG. 11 is an isometric exploded view diagram illustrating another embodiment of a clutch 1100 in accordance with the present invention. The depicted embodiment illustrates a clutch 1100 that is capable of implementing an automatic clutch in a vehicle that has a center clutch assembly directly coupled to the crankshaft of an engine and a basket coupled to the transmission. Conversely, the above described clutches of FIGS. 1-10 illustrate clutches capable of implementation in a system where the clutch basket 104 spins with the engine and the center clutch spins with the transmission.

The clutch 1100 is provided with a basket 1102, a center clutch thrust washer 1104, a center clutch 1106, a clutch pack 1108, a Belleville snap ring 1110, Belleville springs 1112, an upper thrust 1114, pins 1116, a rotating hub 1118, a clutch lifter 1120, a lower assembly snap ring 1122, a clutch lifter spacer 1123, a first wave spring 1124, a spring retainer 1126, a second wave spring 1128, a pressure plate 1130, balls 1132, and a top plate 1134.

The depicted clutch 1100 functions in a manner similar to that described above with reference to FIGS. 1 and 2, however, because the center clutch 1106 spins with the engine there is no need for a thrust bearing to allow the center clutch to rotate independently. Furthermore, the pressure plate 1130, in certain embodiments, does not require tabs that locate the pressure plate with the basket 1102.

Figure 12:
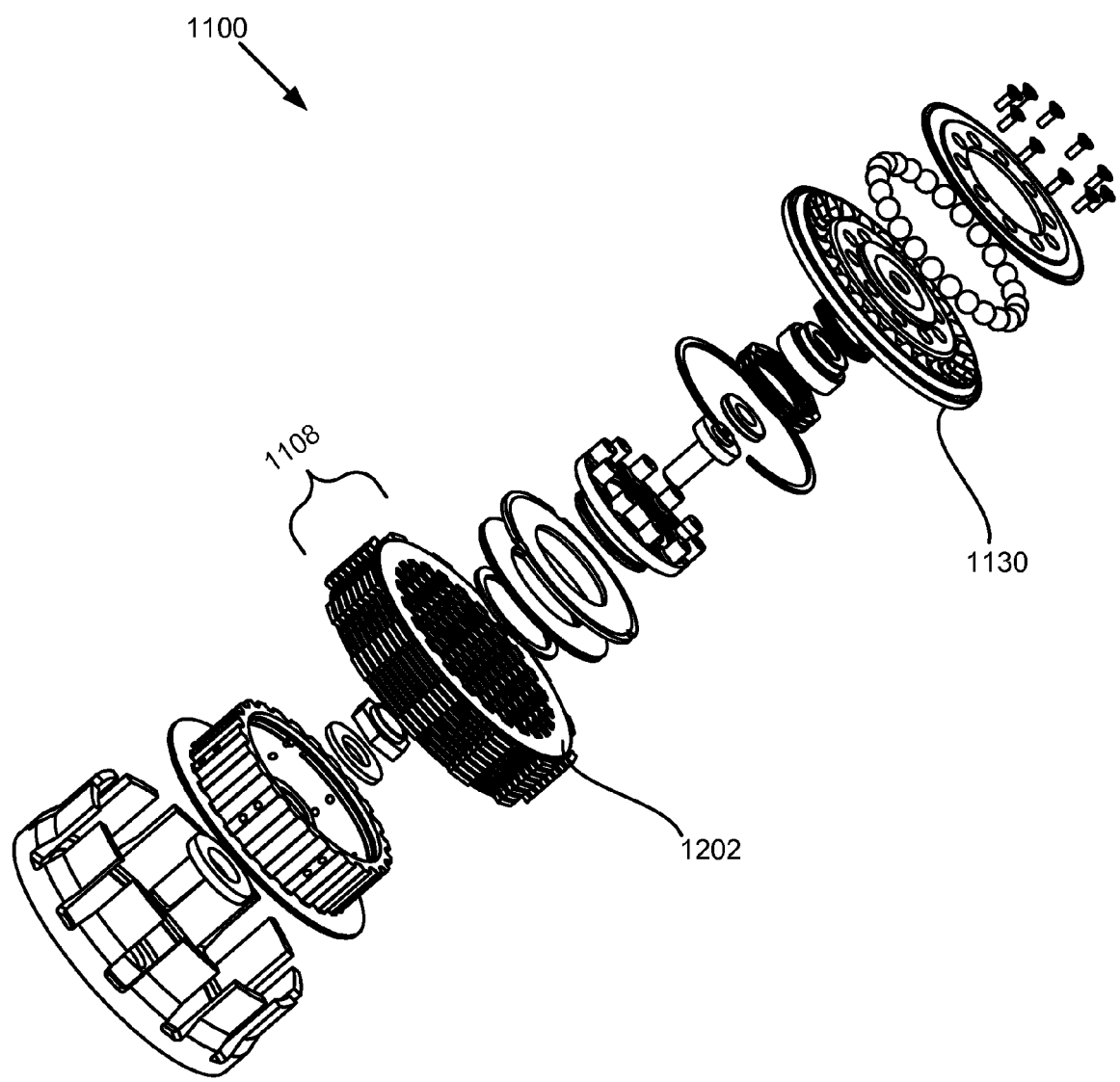
FIG. 12 is an isometric exploded view diagram illustrating another embodiment of a clutch in accordance with the present invention.

In one embodiment, the clutch pack 1108 is configured with a friction plate 1136 that interfaces with the pressure plate 1130. In order to compensate for the torque differential between the friction plate 1136 and the pressure plate 1130, the clutch 1100 is configured with the pins 1116 that transfer torque between the upper thrust 1114 and the pressure plate 1130. The pins 1116 are configured to be rigidly connected with the upper thrust 1114, and pass through openings 1136 in the rotating hub 1118. FIG. 12 illustrates an alternative embodiment for handling the torque differential.

FIG. 12 is an isometric exploded view diagram illustrating another embodiment of a clutch 1100 in accordance with the present invention. The depicted embodiment illustrates a clutch 1100 configured for a crankshaft driven center clutch as described above with reference to FIG. 11. In an alternative embodiment, the clutch pack 1108 may be configured with a drive plate 1202 for interfacing with the pressure plate 1130. The underside (facing inward) surface of the drive plate 1202 receives the torque differential and transfers this torque to the center clutch, thereby eliminating the need for the pins 1116. In this configuration the pressure plate is not subject to the torque differential and only applies a pressure to the clutch pack.

Figure 13:
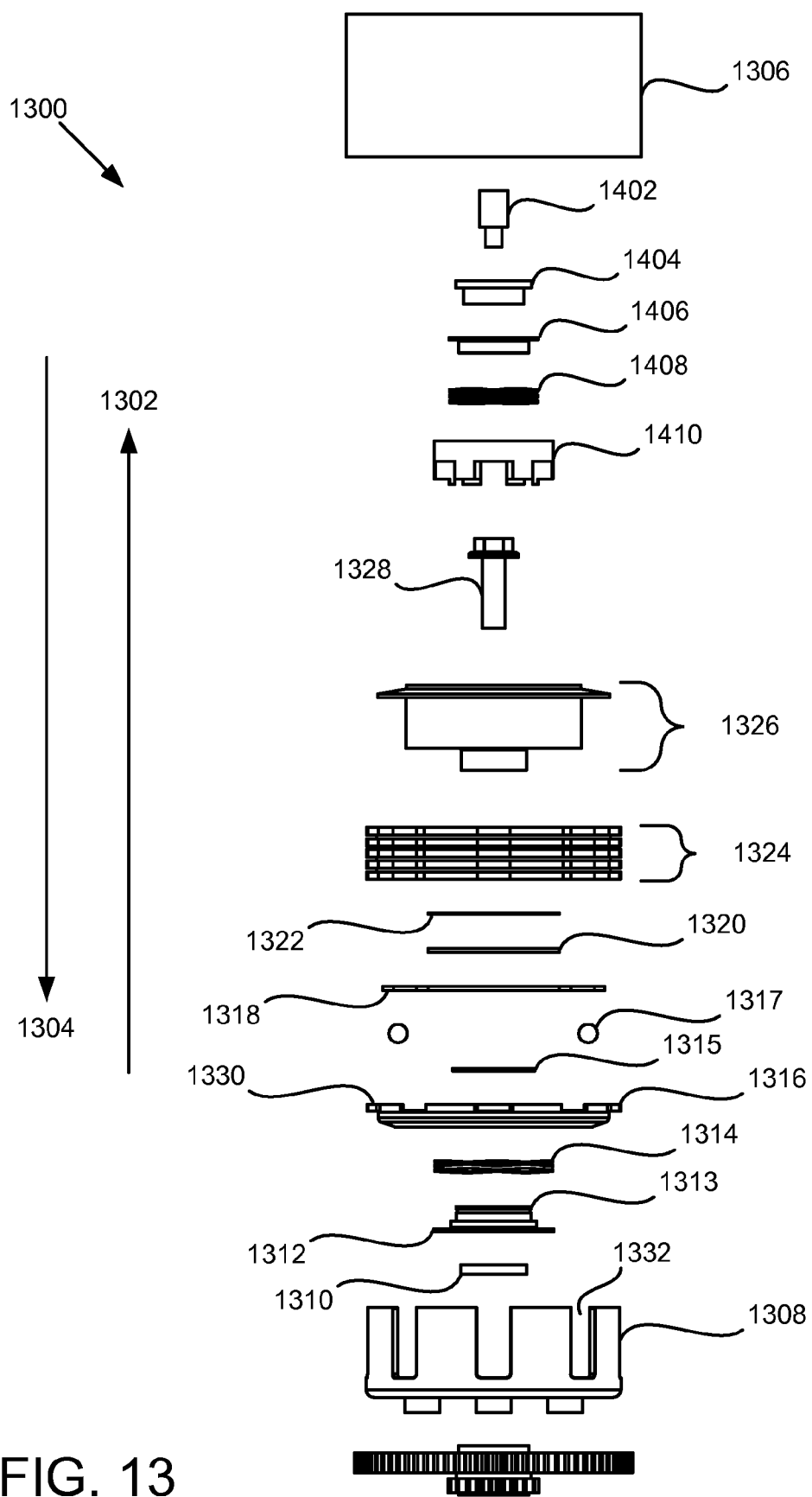
FIG. 13 is a side exploded view diagram illustrating another embodiment of a clutch having a pressure plate in the base of the clutch basket in accordance with the present invention.

FIG. 13 is a side exploded view diagram illustrating another embodiment of a clutch 1300 having a pressure plate in the base of the clutch basket in accordance with the present invention. In one embodiment, the clutch 1300 of FIG. 13 includes many of the components of the clutch described above with reference to FIGS. 1-12.

For clarity purposes, reference will be made to "upward" and "downward" directions. As used herein, the term upward refers to a direction pointing away from the transmission input shaft or towards a clutch cover 1306. Arrow 1302 illustrates this upward direction. The term "outward," with respect to FIGS. 13-16 refers to a radial direction pointing away from a longitudinal axis. As used herein "downward" refers to the opposite direction of "upward," and is graphically represented by arrow 1304.

The clutch 1300 comprises, in one embodiment, a clutch basket 1308, rotationally coupled to the engine and having an opening in the center for engaging and locating the transmission input shaft (not shown). The transmission input shaft extends through a washer 1310, spring plate 1312, wave spring 1314, pressure plate 1316, top plate 1318, thrust bearing 1320, thrust washer 1322, clutch pack 1324, and center clutch 1326. The center clutch 1326 is rotationally coupled to the transmission shaft. The center clutch bolt 1328 secures the above listed elements to a shoulder on the transmission input shaft.

The spring plate 1312 is configured having a stepped profile as depicted where the diameter of each step is selected in order to receive the wave spring 1314. The spring plate 1312 is configured to support and receive the wave spring 1314. Additionally, the spring plate 1312 comprises a snap ring groove 1313 for receiving a snap ring 1315. The snap ring 1315 functions to secure the pressure plate 1316 and the wave spring 1314 to the spring plate 1312 and form a spring-loaded pressure plate assembly. As such, the snap ring limits the axial movement of the pressure plate 1316 relative to the spring plate 1312 and preloads the wave spring 1314. The pressure plate 1316 is configured with a plurality of slots for receiving a plurality of balls 1317. The pressure plate 1316 and the balls 1317 function in a manner similar to that described above with reference to FIGS. 1-12. The slots of the pressure plate 1316 may be configured with a continuous incline, or alternatively with a variable incline as illustrated in FIGS. 3 and 4.

The pressure plate 1316, in one embodiment, comprises a plurality of tabs 1330 for engaging a plurality of slots 1332 of the clutch basket 1308. Accordingly, the pressure plate 1316 is coupled rotationally with the clutch basket 1308. The wave spring 1314, in one embodiment, is a force limiting spring that is pre-loaded with a selected pressure. As the clutch 1300 begins to rotate, the balls move outward and, because of the ramped slots, begin to push upward on the top plate. The force provided by the balls 1317 compresses the clutch pack 1324. At even higher rotational speeds, the force generated by the balls 1317 may be undesirable. Once the force generated by the balls 1317 reaches the selected pressure of the wave spring 1314, the wave spring begins to compress and absorb some of the force generated by the balls 1317 thereby ensuring that excessive force is not transferred into the clutch pack 1324.

Figure 14:
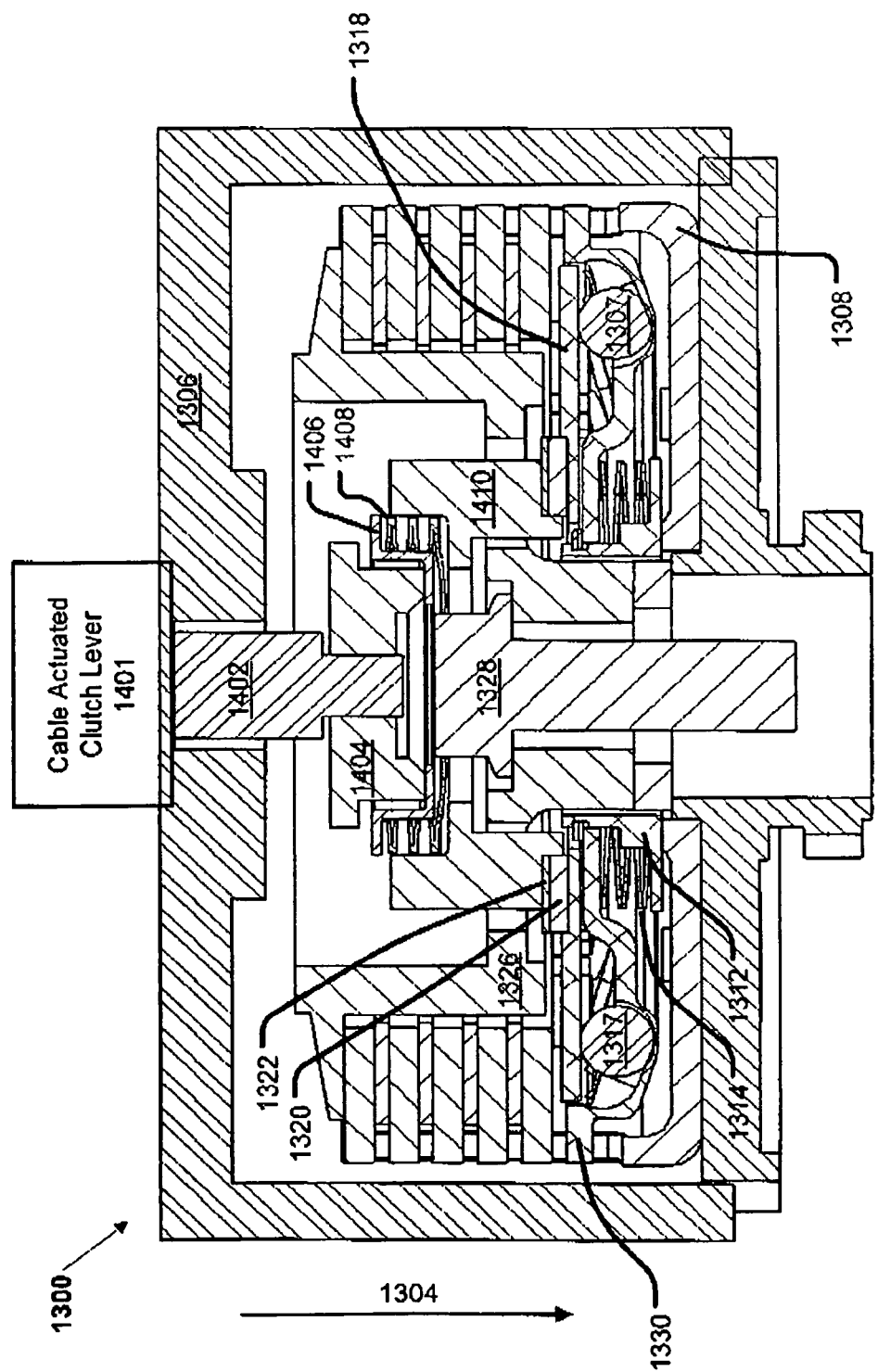
FIG. 14 is a side cross section view diagram illustrating one embodiment of the clutch having a pressure plate in the base of the clutch basket in accordance with the present invention.

FIG. 14 is a side cross section view diagram illustrating one embodiment of the clutch having a pressure plate in the base of the clutch basket in accordance with the present invention. The components in FIG. 14 are substantially equivalent to the components of FIG. 13, and although depicted herein in a certain arrangement, may be arranged in other orders while still accomplishing the same purpose.

The clutch 1300, in one embodiment, includes a throw-out assembly which comprises a bearing hub 1402, throw-out 1404, and a spring retainer 1406. The throw-out assembly is configured to enable manual override of the clutch 1300. A wave spring 1408 is disposed between the spring retainer 1406 and a rotating standoff hub 1410. The standoff hub 1410 includes a plurality of posts and extends downward to the thrust washer 1322 and thrust bearing 1324 and is configured to transfer an axial downward force to the top plate 1318 in order to disengage the clutch 1300 regardless of engine speed. The wave spring 1408 may be pre-loaded with a selected force in order to push upward on the bearing hub 1402 and subsequently push on the manual override clutch lever. Additionally, in the depicted embodiment, the wave spring 1408 provides a downward force on the top plate for the balls 1417 to overcome and thereby prevent the clutch from engaging until a specific RPM is reached.

In one embodiment, the manual override comprises a standard cable actuated clutch lever 1401. The wave spring 1408 beneficially pushes upward on the bearing hub 1402, providing a force that "holds out" the clutch lever in a disengaged position. Manual override of the clutch 1300 is achieved when the clutch lever is depressed and the downward force is transferred to the rotating standoff hub 1410 and subsequently to the top plate 1318.

Figure 15:
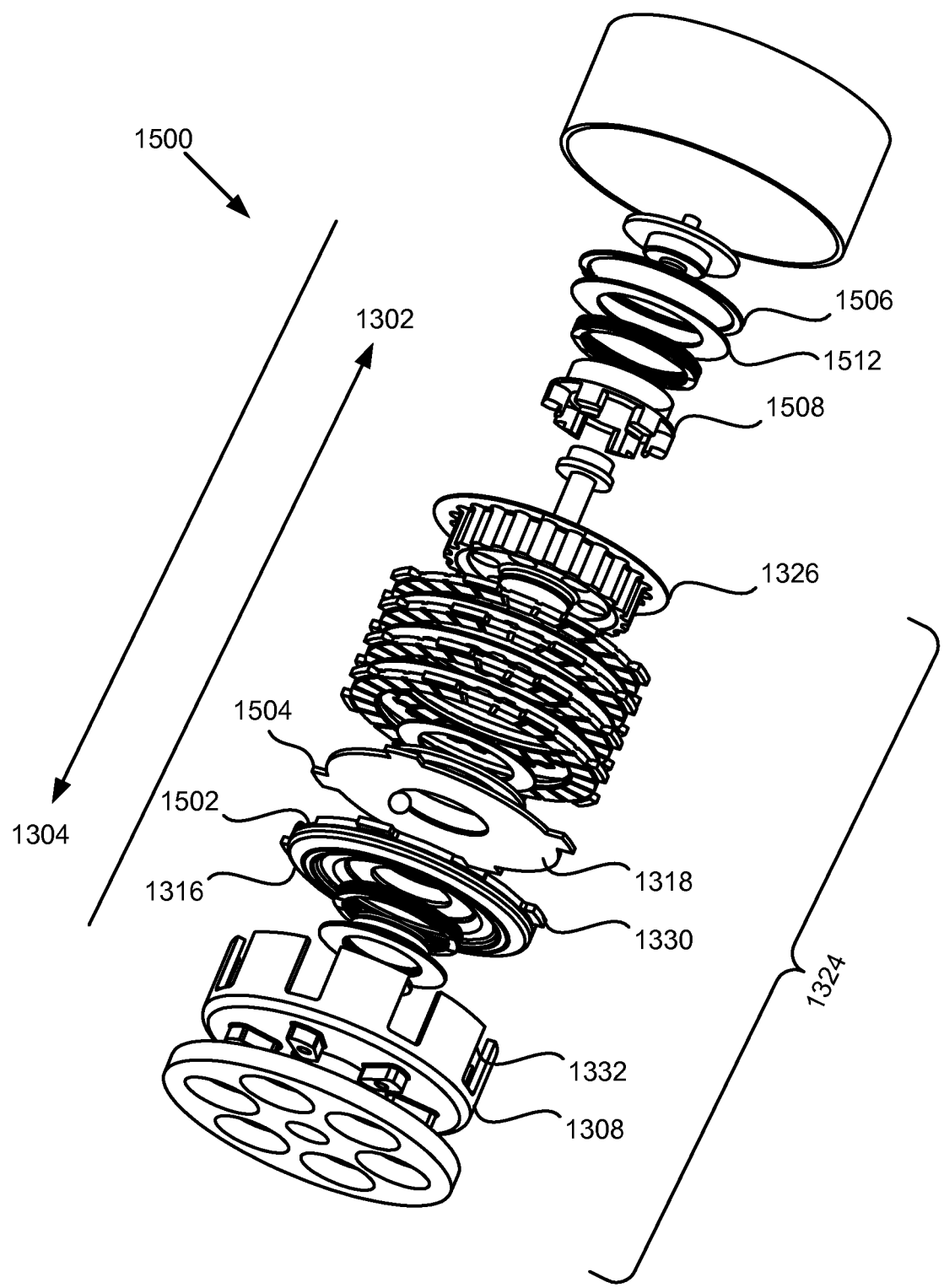
FIG. 15 is an isometric exploded view diagram illustrating one embodiment of a clutch in accordance with the present invention.

FIG. 15 is an isometric exploded view diagram illustrating one embodiment of a clutch 1500 in accordance with the present invention. The depicted embodiment illustrates a clutch 1500 assembly having elements similar to those of FIGS. 13 and 14. In one embodiment, the clutch 1500 comprises a lower clutch assembly 1502 that is substantially similar to what is previously described with reference to FIGS. 13 and 14.

The pressure plate 1316, as described above, comprises a plurality of tabs 1330 for interfacing with the slots 1332 of the clutch basket 1308. The pressure plate 1316, in a further embodiment, may also include a plurality of cutouts 1502 for receiving tabs 1504 of the top plate 1318. In one embodiment, the clutch 1500 is designed such that the tabs 1330 of the pressure plate 1316 and the tabs 1504 of the top plate 1318 engage different slots 1332 of the clutch basket. This beneficially distributes the force evenly on the clutch basket 1308 and prevents damage. The cutouts 1502 together with the tabs 1504 of the top plate 1318 compel the top plate 1318 to rotate with the pressure plate 1316, and locate the top plate 1318 concentrically with the other components of the clutch 1500.

The clutch 1500 may include a throw-out assembly configured for interfacing with a hydraulic clutch actuator. Unlike the cable actuated clutch, a hydraulic clutch does not need to be "held out" by the throw-out assembly. Therefore, in one embodiment, the clutch 1500 may be configured with a snap ring 1506 rigidly coupled with the center clutch 1326. The snap ring 1506 retains the spring thrust washer 1512 to prevent the wave spring 1408 from pushing upward 1302 on the throw-out 1510. However, in the depicted embodiment, the downward force supplied by the hydraulic clutch assembly is transferred through the rotating standoff hub 1508 to the top plate 1318 in order to disengage the clutch 1500.

Figure 16:
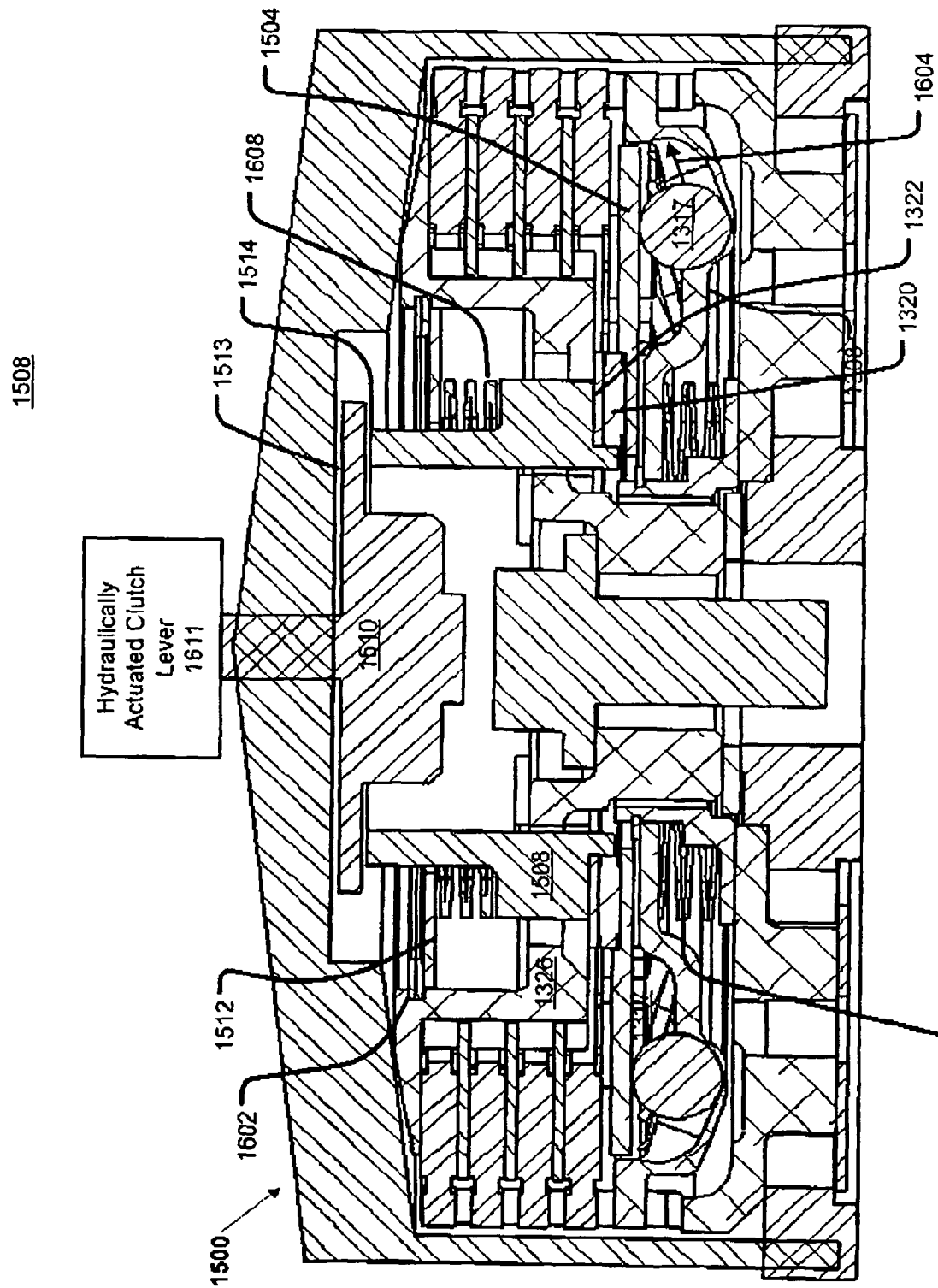
FIG. 16 is a side cross section view diagram illustrating the embodiment of the clutch configured for use with a hydraulic clutch actuator in accordance with the present invention.

FIG. 16 is a side cross section view diagram illustrating the embodiment of the clutch 1500 configured for use with a hydraulic clutch actuator in accordance with the present invention. The depicted embodiment illustrates the throw-out 1510 interfacing with the rotating standoff hub 1508. The snap ring 1506 may be seated in a snap ring groove 1602 formed in the center clutch 1326 to retain the spring thrust washer 1512, or alternatively integrally formed in the center clutch. When the lever of a hydraulically actuated clutch 1611 is depressed, the throw-out 1510 travels downward. The leading edge of the throwout 1513 presses against the receiving edge of the rotating standoffs 1514 transferring the downward force through the rotating standoff hub 1508 to the thrust washer and the thrust bearing 1320 which are in contact with the top plate 1504. The downward force causes the lower wave spring 1316 to compress and thereby disengage the clutch 1500.

The lower wave spring 1316 is a force limiting wave spring because, as described above, the lower wave spring 1316 allows the upward force generated by the balls 1317 to compress the clutch pack until the force is greater than the pre-loaded force of the lower wave spring 1316. At this point the lower wave spring 1316 begins to compress and any further force generated by the balls 1317 is beneficially transferred to the lower wave spring 1316 thereby increasing the longevity of the clutch pack. Conversely, the upper wave spring 1608 functions as an engagement speed wave spring by applying a downward force on the top plate that must be overcome by the balls 1317 before engagement of the clutch pack can occur. Therefore, it is possible to determine an engagement RPM by selecting the pre-load of the upper wave spring 1608.

FIGS. 1-12 describe a clutch having a pressure plate that pushes downward in order to compress the clutch pack and engage the clutch. FIGS. 13-16 describe a clutch system having a pressure plate that is configured to transfer the rotational movement of the balls 1317 into an upward force that engages the clutch pack. As the clutch assembly begins to rotate, the balls travel outward and upward in a direction indicated by arrow 1604. Centrifugal forces cause the balls 1317 to climb higher in the slot. As the balls 1317 travel outward and upward in the slot, the balls 1317 push upward on the top plate 1504. This upward force compresses the clutch pack and engages the clutch 1500. Likewise, reduced rotational velocity of the clutch causes the balls 1317 to return to a lower position and subsequently disengage the clutch.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for automatic centrifugal engagement of a pressure plate, the apparatus comprising:
   a center clutch coupled rotationally with a transmission input shaft;
   a clutch basket coupled rotationally with an engine output shaft;
   a clutch pack disposed between the center clutch and the clutch basket, the clutch pack comprising a plurality of drive plates rotationally coupled to the center clutch and a plurality of friction plates rotationally coupled with the clutch basket;
   a centrifugal pressure plate assembly that is spring-loaded and disposed between the center clutch and the clutch basket, the centrifugal pressure plate assembly comprising a pressure plate, a spring plate, and a spring disposed between the pressure plate and the spring plate;
   a rotating standoff hub passing through and rotationally coupled with the center clutch and an engagement spring configured to apply a spring force to said centrifugal pressure plate assembly through the rotating standoff hub to prevent engagement of the clutch pack until the centrifugal pressure plate assembly has reached a predetermined speed.

2. The apparatus of claim 1, wherein the spring plate is further configured with a snap ring groove configured to engage a snap ring.

3. The apparatus of claim 2, wherein the snap ring is configured to limit the axial movement of the pressure plate relative to the spring plate and preload the spring.

4. The apparatus of claim 2, wherein the spring comprises a wave spring preloaded with a force in the range of between about 100 and 600 pounds.

5. The apparatus of claim 1, wherein the pressure plate comprises a plurality of ramps positioned radially around the perimeter of the pressure plate, each ramp configured to maintain one centrifugal actuating member.

6. The apparatus of claim 5, wherein the centrifugal actuating member is selected from a group consisting of ball bearings, needle bearings, roller bearings, and tapered roller bearings.

7. The apparatus of claim 5, wherein the ramps comprise a first incline portion and a second incline portion, the first incline portion having an angle greater than the second incline portion and extending for a length sufficient to allow the centrifugal actuating member to cause at least partial clutch engagement while on the first incline portion.

8. The apparatus of claim 1, further comprising a cable manual override configured to enable manual override of clutch engagement, the cable manual override comprising a cable actuated clutch lever coupled with a throw-out assembly, the throw-out assembly configured to axially move a top plate and disengage the clutch.

9. The apparatus of claim 8, wherein the engagement spring is disposed between the rotating standoff hub and the throw-out and configured to provide a force that maintains the cable actuated clutch lever in a disengaged position.

10. The apparatus of claim 1, further comprising a hydraulic manual override configured to enable manual override of clutch engagement, the hydraulic manual override comprising a hydraulic actuated clutch lever coupled with a throw-out assembly, the throw-out assembly configured to axially move a top plate and disengage the clutch.

11. A system for automatic centrifugal engagement of a pressure plate, the apparatus comprising:

a center clutch coupled rotationally with a transmission input shaft;
a clutch basket including an opening and a base opposite the opening and coupled rotationally with an engine output shaft;
a clutch pack disposed between the center clutch and the clutch basket, the clutch pack comprising a plurality of drive plates rotationally coupled to the center clutch and a plurality of friction plates rotationally coupled with the clutch basket; a centrifugal pressure plate assembly that is spring-loaded and disposed within the opening of the clutch basket and in contact with the base of the clutch basket, the centrifugal pressure plate assembly comprising a pressure plate, a spring plate, and a spring disposed between the pressure plate and the spring plate; wherein the spring plate is further configured with a snap ring groove configured to engage a snap ring and including a rotating standoff hub passing through and rotationally coupled with the center clutch and an engagement spring configured to apply a spring force to said centrifugal pressure plate assembly through the rotating standoff hub to prevent engagement of the clutch pack until the centrifugal pressure plate assembly has reached a predetermined speed.

12. The system of claim 11, wherein the snap ring is configured to limit the axial movement of the pressure plate relative to the spring plate and preload the spring.

13. The system of claim 11, wherein the spring comprises a wave spring preloaded with a force in the range of between about 100 and 600 pounds.

14. The system of claim 11, wherein the pressure plate comprises a plurality of ramps positioned radially around the perimeter of the pressure plate, each ramp configured to maintain one centrifugal actuating member.

15. The system of claim 11, further comprising a wave spring disposed between the rotating standoff hub and a throw-out and configured to provide a force that maintains the actuated clutch lever in a disengaged position.

* * * * *